W. A. DYE.
COTTON PLANTER.
APPLICATION FILED APR. 10, 1915.
1,233,205.
Patented July 10, 1917.
2 SHEETS—SHEET 1.
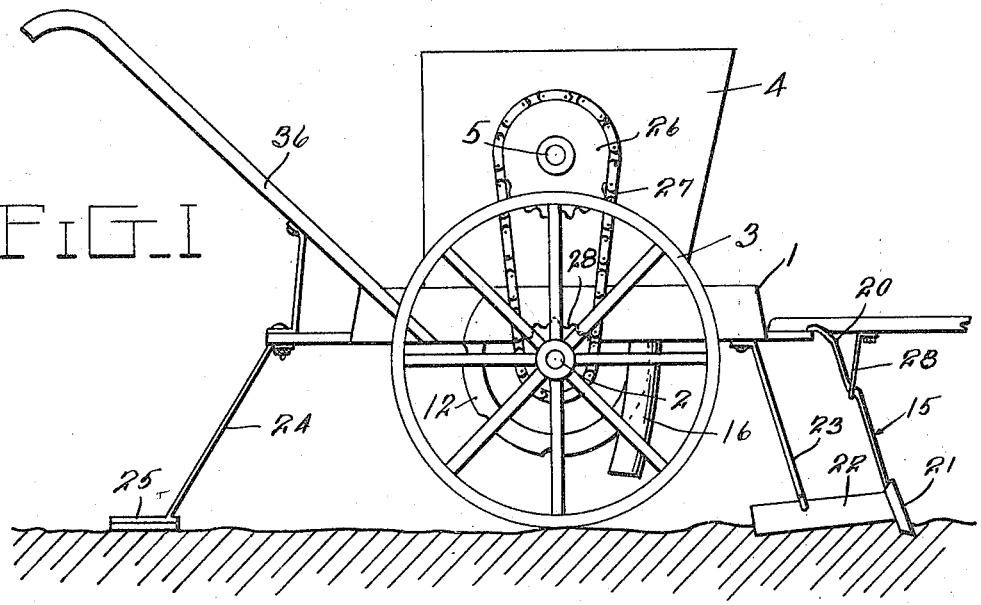
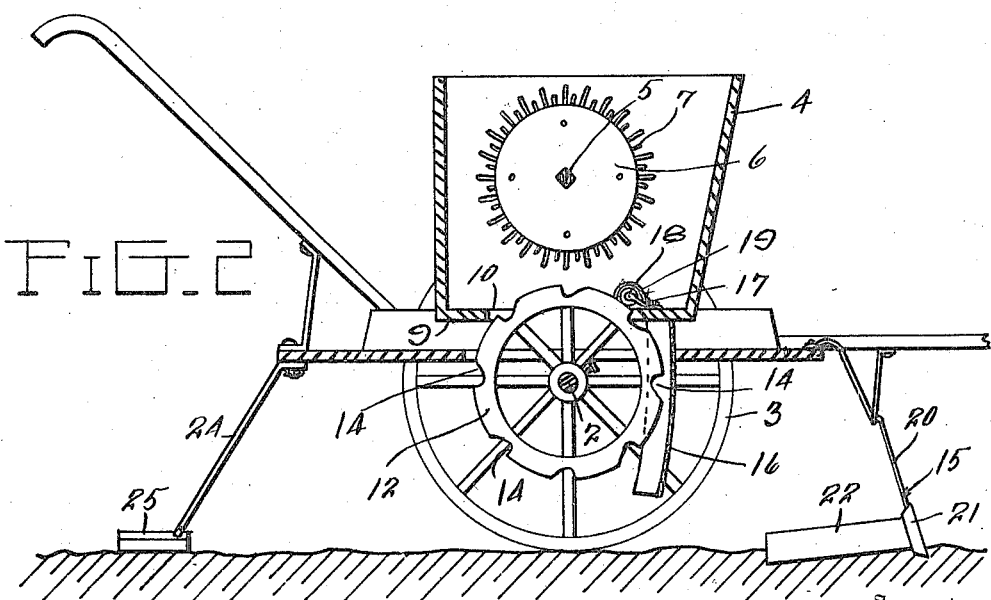

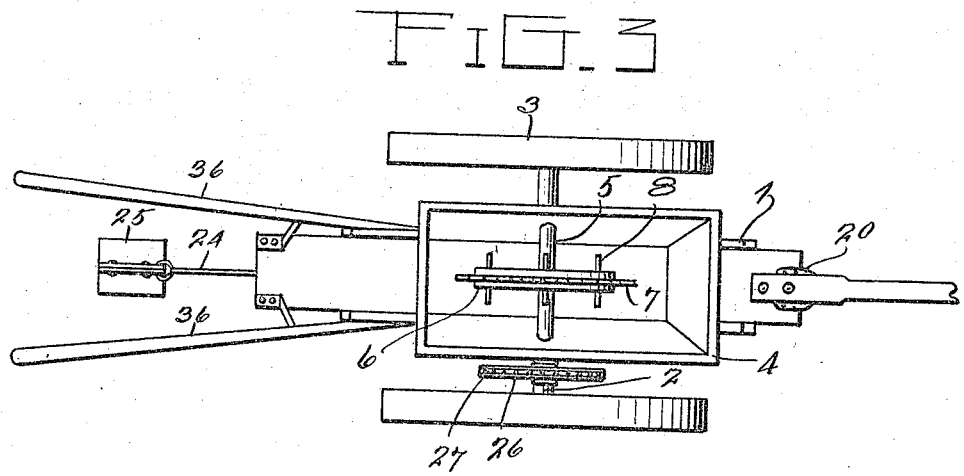
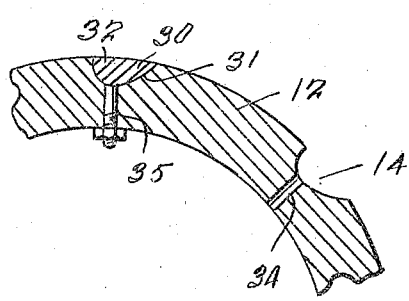
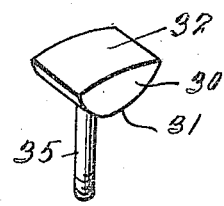
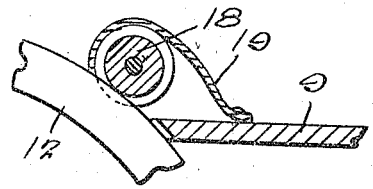

UNITED STATES PATENT OFFICE.

WILLIAM A. DYE, OF CHERRY VALLEY, ARKANSAS.

COTTON-PLANTER.

1,233,205.    Specification of Letters Patent.    Patented July 10, 1917.

Application filed April 10, 1915. Serial No. 20,459.

*To all whom it may concern:*

Be it known that I, WILLIAM A. DYE, a citizen of the United States, residing at Cherry Valley, in the county of Cross and State of Arkansas, have invented certain new and useful Improvements in Cotton-Planters; and I do hereby declare the following to be a full, clear, and exact description of the invention, such as will enable others skilled in the art to which it appertains to make and use the same.

This invention relates to cotton planters, and the primary object of the invention is to provide a device for planting cotton, which includes a rotary cotton dispensing wheel, provided with a plurality of circumferentially spaced peripheral recesses, for receiving a small quantity of cotton seeds and depositing them in a furrow, and further to provide furrow opening means positioned forwardly of the cotton seed dispensing means.

Another object of this invention is to provide a cotton planter including agitating means positioned within the seed retaining hopper, for insuring the efficient feeding of the seeds to the dispensing wheel, and also to provide means for covering the seeds after having been planted.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a side elevation of the improved cotton planter,

Fig. 2 is a longitudinal sectional view through the planter,

Fig. 3 is a top plan view of the planter,

Fig. 4 is a fragmentary sectional view of a part of the seed dispensing wheel,

Fig. 5 is a fragmentary sectional view of the means for regulating the number of seeds dispensed by the seed dispensing wheel, and Fig. 6 is a detailed perspective view of the plug for seating in the peripheral recesses formed in the dispensing wheel for regulating the distance between the hills of seeds planted.

Referring more particularly to the drawings, 1 designates the supporting structure of the cotton planter, which rotatably supports an axle 2, upon the spindle ends of which are mounted ordinary traction wheels 3. The supporting frame 1 has a hopper 4 mounted thereupon, which is provided for retaining cotton seed, to be planted. The hopper 4 has a rectangular shaft 5 journaled transversely therethrough, upon which shaft is mounted an agitating wheel 6. The wheel 6 has a plurality of circumferentially spaced radially extending agitating fingers 7 mounted upon the periphery thereof, and a plurality of laterally extending agitating fingers 8 mounted upon the sides of the wheel, and extending transversely across the interior of the hopper, for efficiently agitating the seeds, and insuring their free escaping movement within the hopper.

The bottom 9 of the hopper, is provided with a longitudinally extending slot 10, through which the upper section of a dropping wheel 12 extends.

The dropping wheel 12 is mounted upon the axle 2, for synchronous rotation therewith, and it is provided with a plurality of circumferentially spaced peripheral recesses or pockets 14, which are provided for receiving cotton seeds therein, and carrying them outwardly for deposit in a furrow, which is formed by a furrow opening construction 15.

The pockets or recesses 14 have one of their edges substantially straight, while the other edge inclines outwardly toward the periphery of the wheel, so as to permit the cotton seeds to fall freely therefrom into the furrow.

The hopper 4 has its spout or guard plate 16 secured to and extending forwardly therefrom, through which the forward section of the dropping wheel 12 travels, for preventing the cotton seed from flying forwardly of the machine, and insuring the proper dropping of the seed.

The bottom 9 of the hopper 4 has resilient arms 17 secured thereto, the outer ends of which rotatably support a roller 18. The roller 18 rests upon the periphery of the wheel 12, and prevents an excess number of cotton seed from passing outwardly with the rotation of the wheel, and the passage of the various pockets or recesses 14 out of the hopper. A guard plate 19 extends over the top of the roller, and prevents the cotton seeds from obstructing the operation of the same.

The furrow opening means 15 is positioned forwardly of the dropping wheel 12, and includes a standard 20, which has a furrow opening plow 21 mounted upon its lower end. The plow 21 has rearwardly extending blades 22 carried thereby, for properly forming a furrow. The supporting arm 20 of the standard, and the blades 22 are supported by suitable bracing arms 23.

The supporting frame 1 has a rearwardly extending bracing arm 24 connected thereto, to the lower end of which is attached a furrow closer 25, which follows in the path of the furrow opener structure 15, and covers the seeds, after they have been deposited by the wheel 12, in the furrow formed by the furrow opening structure 15.

The shaft 5 has a sprocket 26 mounted upon one end thereof, about which a sprocket chain 27 travels. The chain 27 also travels about a sprocket 28 which is mounted upon the axle 2 by means of which the shaft 5 and the agitator 8 are rotated by the rotation of the axle 2.

A plug 30 is provided, which has its under surface 31 engaged to conform to the shape of the walls of the recesses or pockets 14, and its outer surface 32 shaped to conform to the curvature of the periphery of the wheel 12. The dropping wheel 12 is provided with radially extending openings 34, formed therein which communicate with the pockets 14, and are provided for receiving the shanks 35, which are formed upon the plug 30. The plug 30 is provided for insertion in any of the pockets 14, for decreasing the number of pockets within the periphery of the wheel and consequently regulating the distance between the hills of seeds dropped or planted.

The supporting structure 1 has handles 36, secured thereto, which extend inwardly and rearwardly from the supporting body 1 and are of the ordinary construction of handles used in agricultural implements of this nature.

In planting cotton or other similar seeds, the seeds are deposited in the hopper 4, and are fed downwardly, by gravity and by the action of the agitator 6, which is rotatably positioned within the hopper. The dropping wheel 12 rotating by the rotation of the axle 2, will travel through the lower section of the hopper, at which time a certain amount of seed will be deposited in the various peripheral pockets or recesses 14. The roller 18 will prevent an excess number of seeds passing out of the hopper, with the rotation of the wheel, and will also prevent seeds from clinging to the periphery of the wheel. The seeds will be deposited from the pockets 14, during the rotation of the wheel 12 and will be properly guided downwardly into the furrow formed by the furrow opening structure 15, by the guard plate 16. After the seeds have been dropped, the furrow closing structure 25 will close the furrow and properly cover the seeds.

From the foregoing description taken in connection with the accompanying drawings the advantages of construction and of the method of operation of the improved cotton planter will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

A cotton planter comprising a supporting structure, a hopper carried by said structure and having a slot therein, a dropping wheel journaled to said structure and extending into the slot, means for rotating said wheel, said wheel having a plurality of circumferentially spaced peripheral pockets to receive seeds from the hopper, a guard plate secured to and extending downwardly of said hopper for receiving the forward section of the wheel to prevent the seeds from flying forwardly of the device, resilient arms secured to the hopper and extending in the direction of the wheel, a roller journaled to said arms and engaging the periphery of the wheel to prevent excess number of seeds from passing outwardly of the hopper with rotation of the wheel, and a guard plate secured to the hopper and curved to overlie the roller to prevent obstruction of the operation of said roller.

In testimony whereof I affix my signature in presence of two witnesses.

WILLIAM A. DYE.

Witnesses:
J. KELLY MADDOX,
PAUL C. JORDAN.